United States Patent
Takatori et al.

(10) Patent No.: US 6,949,050 B2
(45) Date of Patent: Sep. 27, 2005

(54) SHIFT PRESSURE CONTROL FOR AUTOMATIC TRANSMISSION

(75) Inventors: Kazuhiro Takatori, Yokohama (JP); Morimasa Yamawaki, Kanagawa (JP); Koji Koizumi, Kanagawa (JP); Nobuaki Mochizuki, Tokyo (JP); Hiroyuki Tsukamoto, Kanagawa (JP)

(73) Assignee: JATCO Ltd, Fuji (JP)

( * ) Notice: Subject to any disclaimer, the term of this patent is extended or adjusted under 35 U.S.C. 154(b) by 47 days.

(21) Appl. No.: 10/774,386

(22) Filed: Feb. 10, 2004

(65) Prior Publication Data

US 2004/0162186 A1 Aug. 19, 2004

(30) Foreign Application Priority Data

Feb. 14, 2003 (JP) ........................................ 2003-035898

(51) Int. Cl.$^7$ .............................................. F16H 61/26
(52) U.S. Cl. ...................................................... 477/156
(58) Field of Search ................................. 477/156, 158

(56) References Cited

U.S. PATENT DOCUMENTS 5,792,021 A * 8/1998 Minowa et al. ............. 477/106
5,842,950 A * 12/1998 Tsutsui et al. .............. 477/143
6,364,811 B1 * 4/2002 Hubbard et al. ............ 477/143
6,398,693 B1 * 6/2002 Kawamura ................. 477/158

FOREIGN PATENT DOCUMENTS

JP          6-331017 A      11/1994

* cited by examiner

*Primary Examiner*—Dirk Wright
(74) *Attorney, Agent, or Firm*—Foley & Lardner LLP

(57) ABSTRACT

A shift pressure control apparatus for an automatic transmission is arranged to hold the shift pressure during a shift at a starting input-torque-dependent pressure determined from a transmission input torque at a start of a shift. A controller is configured to monitor an operating parameter representing an engine load of an engine, to detect an engine load change. When the engine load change is detected, the controller modifies the shift pressure to a modified pressure determined by modifying the starting input-torque-dependent pressure with a difference between a second engine-load-dependent pressure determined from the engine load after the engine load change and a first engine-load-dependent pressure determined from the engine load at the start of the shift.

11 Claims, 7 Drawing Sheets

SHIFT PRESSURE CONTROL FOR AUTOMATIC TRANSMISSION

BACKGROUND OF THE INVENTION

The present invention relates to shift pressure control system and process for controlling a shift fluid pressure in an automatic transmission.

A Published Japanese Patent Application Publication No. H06(1994)-331017 shows a shift pressure control system for an automatic transmission.

SUMMARY OF THE INVENTION

It is an object of the present invention to provide shift pressure control system and/or process for controlling a shift pressure for an automatic transmission properly even when an engine load is changed during a shift operation.

According to one aspect of the present invention, a shift pressure control apparatus for controlling a shift pressure to perform a shift in an automatic transmission, comprises: a controller to determine a starting input-torque-dependent pressure from a transmission input torque at a start of a shift; to hold the shift pressure at the starting input-torque-dependent pressure during the shift; to monitor an operating parameter representing an engine load of an engine connected with the automatic transmission, to detect an engine load change; and to modify the shift pressure to a modified pressure determined by modifying the starting input-torque-dependent pressure with a difference between a second engine-load-dependent pressure determined from the engine load after the engine load change and a first engine-load-dependent pressure determined from the engine load at the start of the shift when the engine load change is detected.

According to another aspect of the invention, a shift pressure control process for controlling a shift pressure to perform a shift in an automatic transmission, comprises: determining a starting input-torque-dependent pressure from a transmission input torque at a start of a shift; holding the shift pressure at the starting input-torque-dependent pressure during the shift; monitoring an operating parameter representing an engine load of an engine connected with the automatic transmission, to detect an engine load change; and modifying the shift pressure to a modified pressure determined by modifying the starting input-torque-dependent pressure with a difference between a second engine-load-dependent pressure determined from the engine load after the engine load change and a first engine-load-dependent pressure determined from the engine load at the start of the shift when the engine load change is detected.

DETAILED DESCRIPTION OF THE INVENTION

Figure 5:
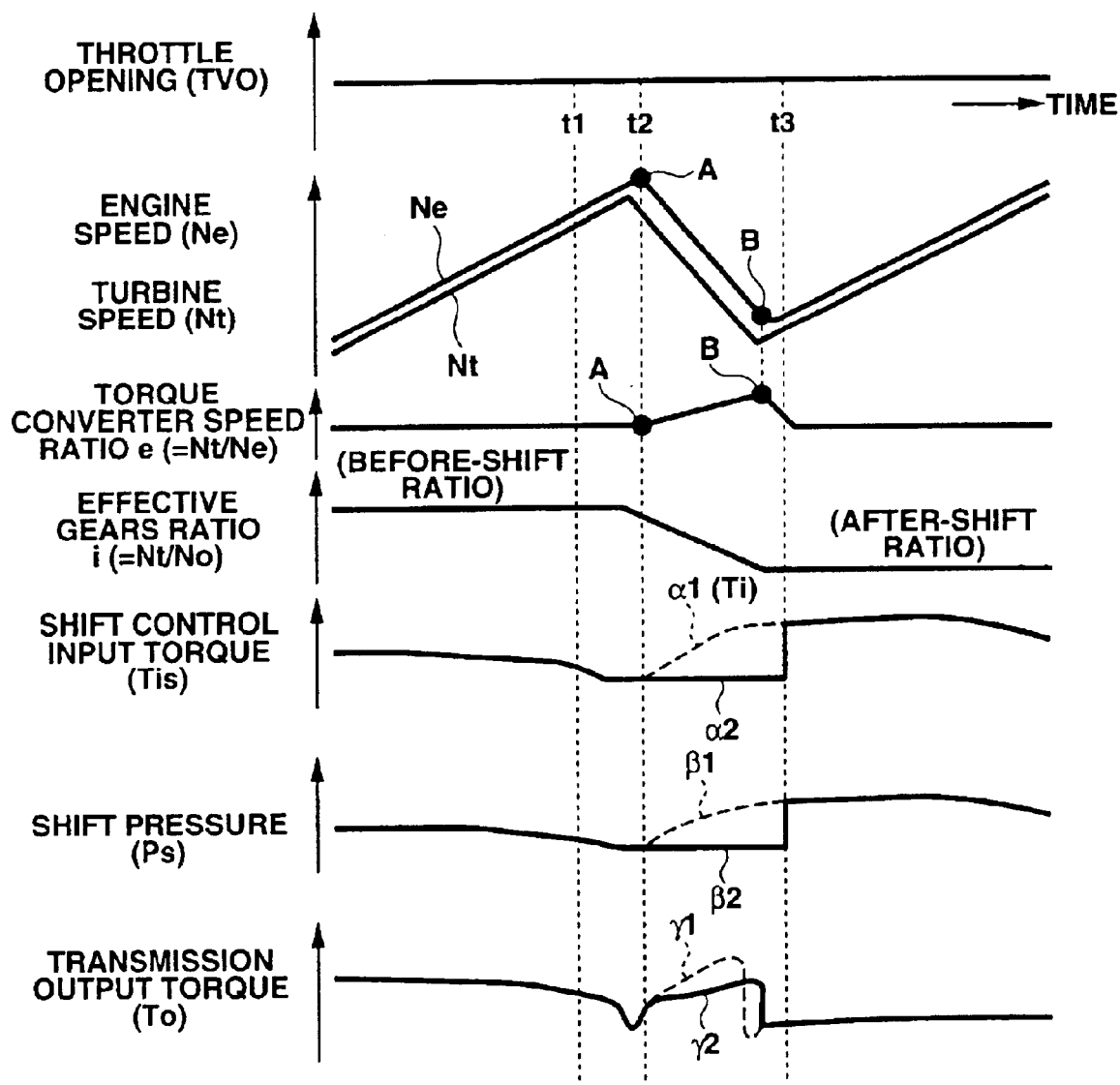
FIG. 5 is a time chart illustrating operations of a shift pressure control system of an earlier technology when there is no accelerator operation during a shift.

FIG. 5 illustrates the shift operation of an automatic transmission. At a shift command instant t1 at which a shift command is produced, a shift pressure control system starts the engagement control of the friction engagement elements for shifting such as clutches and brakes. In the process of the engagement control of the friction engagement elements, the shift proceeds to enter an inertia phase at an instant t2. During the inertia phase, an effective gear ratio i varies from a before-shift-gear ratio to an after-shift-gear ratio, where the effective gear ratio i is specified as a ratio between a turbine speed Nt of the torque converter (transmission input speed) and a transmission output speed No (i=Nt/No). Additionally, an engine speed Ne (torque converter input speed) and the turbine speed Nt (transmission input speed) vary with time, for example, in a manner of time series, as shown in FIG. 5. At an instant t3 the shift operation ends.

During the shift, the engine speed Ne (torque converter input speed) and the turbine speed Nt (torque converter output speed) vary with time and thereby a speed ratio e of the torque converter (e=Nt/Ne) varies with time as shown in FIG. 5.

When, for example, the engine speed Ne and the speed ratio e of the torque converter varies during the shift from the value of point A to the value of point B shown in FIG. 5, respectively, the shift pressure is controlled in the following manner.

Figure 6:
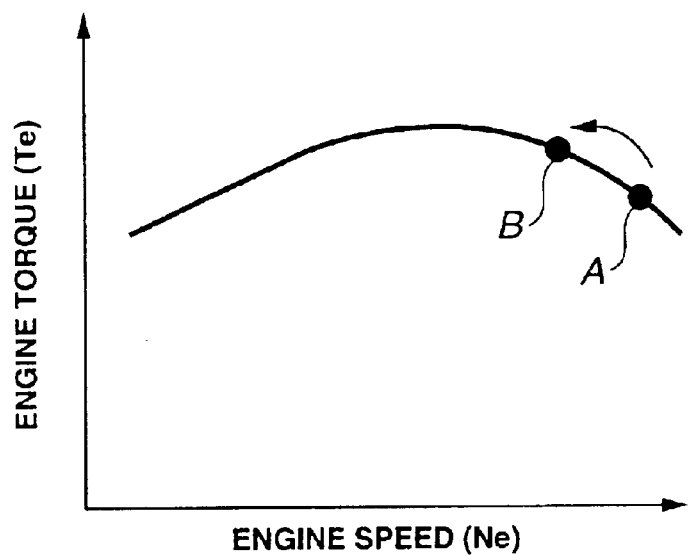
FIG. 6 is a graph showing a characteristic of an engine torque with respect to an engine speed.

The engine torque Te tends to vary with respect to the engine speed Ne as shown in FIG. 6. When the engine speed Ne varies from the value of point A to the value of point B as shown in FIG. 5, the engine torque Te varies from the value of point A to the value of point B as shown in FIG. 6.

Figure 7:
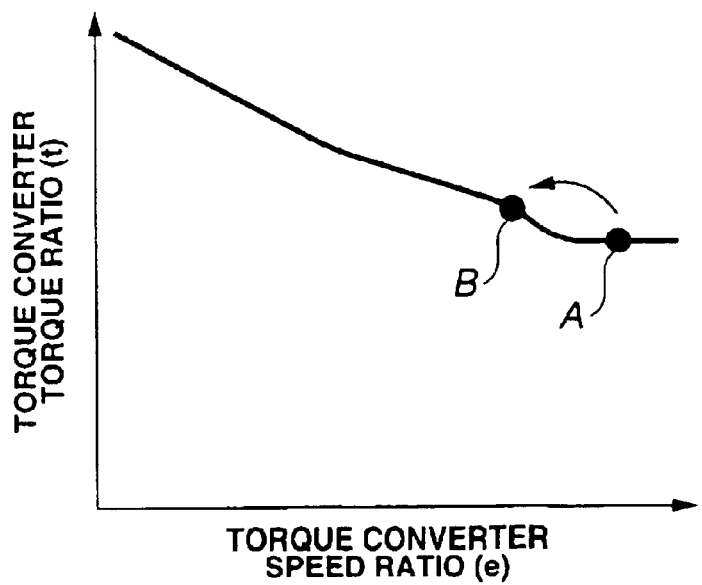
FIG. 7 is a graph showing a characteristic of a torque converter torque ratio with respect to a torque converter speed ratio.

The torque ratio t (output torque/input torque) of the torque converter tends to vary with respect to the speed ratio e of the torque converter as shown in FIG. 7. When the speed ratio e varies from the value of point A to the value of point B as shown in FIG. 5, the torque ratio t varies from the value of point A to the value of point B as shown in FIG. 7.

The transmission input torque Ti is equal to the product obtained by multiplying the engine torque Te by the torque converter torque ratio t, and the transmission input torque Ti during the shift varies with time as shown by a broken line α1 in FIG. 5.

If the control system employs the value of the transmission input torque Ti (α1) as an shift control input torque Tis (input torque used for the shift control) without modification and determines the shift pressure Ps for governing the engagement control of the friction engagement elements, depending on the input torque Ti as shown by a broken line β1 in FIG. 5, the shift pressure Ps becomes excessive to cause a shift shock, as is evident from the variation with time (output torque wave form) of the transmission output torque To during the shift as shown by a broken line γ1.

In order to prevent such an excessive increase of the shift pressure Ps, the control system as disclosed in the before-mentioned Japanese patent document (H06(1994)-331017) holds the shift control input torque Tis at the value of transmission input torque Ti at the shift start instant t2 detected in accordance with the effective gear ratio I, as shown by a solid line α2 in FIG. 5, and determines the shift pressure Ps as shown by a solid line β2 in FIG. 5, in dependence on the thus-held shift control input torque Tis (α2).

Thus determined shift pressure Ps (β2) does not become excessive, and the control system can provide a smooth time variation (output torque waveform) of the transmission output torque To during the shift as shown by a solid line γ2 as compared to the output torque waveform of the conventional example as shown by the broken line γ1, and thereby restrain a shift shock.

Figure 8:
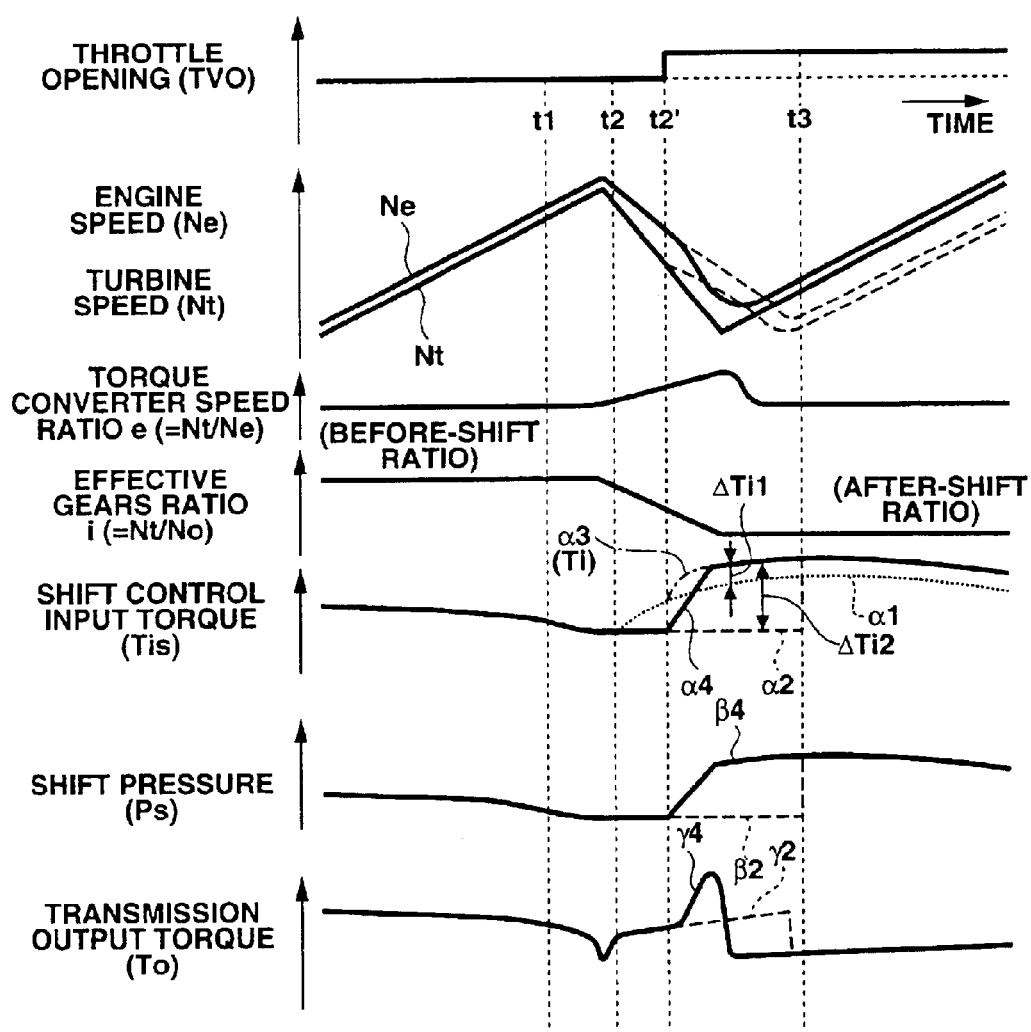
FIG. 8 is a time chart illustrating operations of the shift pressure control system of the earlier technology when the accelerator is operated during a shift.

When the throttle opening TVO is changed by depressing accelerator pedal at an instant t2' during the shift as shown in FIG. 8, the control system of the the before-mentioned Japanese patent document (H06(1994)-331017) releases the hold of the value of the shift control input torque Tis and sets the actual transmission input torque Ti as the shift control input torque Tis, which causes the following problems.

When the throttle opening TVO is increased stepwise at the instant t2' as shown in FIG. 8, the engine speed Ne and the turbine speed Nt vary with time as shown by broken lines, respectively, instead of solid lines (the same as the solid lines shown in FIG. 5). And the speed ratio e of the torque converter and the effective gear ratio i vary as shown in FIG. 8.

With the increase of the engine torque due to the increased throttle opening TVO and the increase of the torque ratio t due to change of the speed ratio e of the torque converter, the transmission input torque Ti is increased as shown by a one-dot chain line α3, from the broken line α1 (corresponding to α1 in FIG. 5) of the case where the throttle opening TVO is not increased.

In this case, the control system of the earlier technology releases the hold of the shift control input torque Tis at the TVO increase instant t2' shown in FIG. 8, and sets the actual transmission input torque Ti (α3) as the shift control input torque Tis as shown by a solid line α4.

Moreover, the control system is adapted to set the shift pressure Ps depending on thus reset input torque Tis (α4), as shown by a solid line β4 in FIG. 8.

Therefore, though the actual increment of the transmission input torque Ti due to the throttle opening TVO increase at the instant t2' in FIG. 8 is equal to the difference between α3 and α1 (α3−α1) as shown by ΔTi1 in FIG. 8, the shift control input torque Tis is increased, after the release of hold of the shift control input torque Tis at the TVO increase instant t2', by the amount equaling to the difference between α3 and α2 (α3−α2) (this α2 corresponds to α2 in FIG. 5) as shown by ΔTi2 in FIG. 8.

Accordingly, the increase of the shift pressure Ps after the release of hold of the shift control input torque Tis becomes as large as the difference between β4 and β2 (β4−β2) (this β2 corresponds to β2 in FIG. 5), beyond the actual increase ΔTi1 of the transmission input torque due to the throttle opening TVO increase at the instant t2'. This excessive increase in shift pressure Ps caises a large torque step in the transmission output torque To as shown by a solid line γ4, resulting in a great shift shock.

On the other hand, if the control sysem keeps the hold of the shift control input torque Tis after the TVO increase instant t2' as shown by the broken line α2 in FIG. 8 and determines the shift pressure Ps depending on the input torque Tis as shown by a broken line β2 in FIG. 8, the transmission output torque To varies with time due to a shortage of the shift pressure Ps as shown by a broken line γ2, which causes feeling of slow shift.

Figure 1:
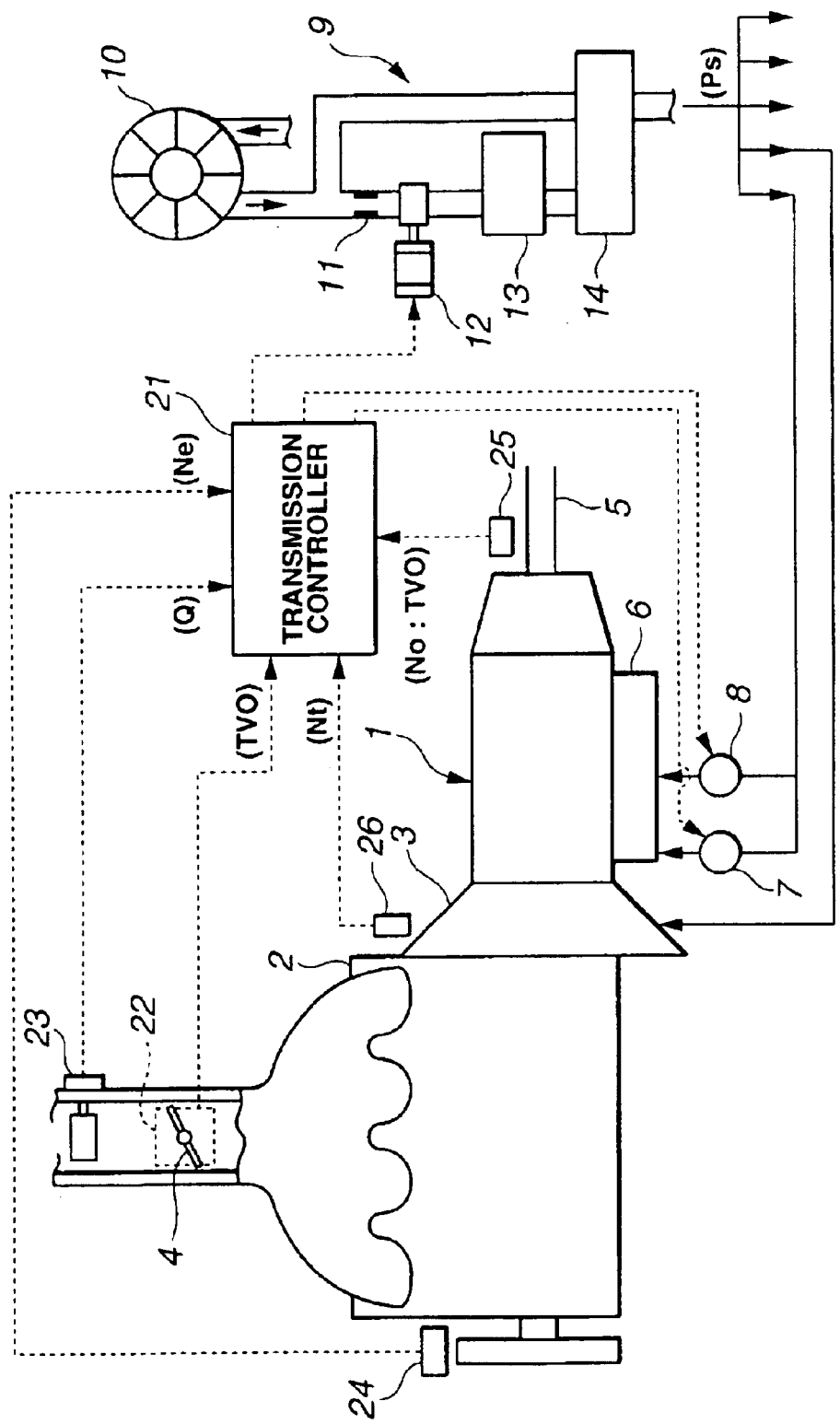
FIG. 1 is a schematic view showing an automatic transmission equipped with a shift pressure control system according to one embodiment of the present invention.

FIG. 1 shows a power train of a vehicle including an automatic transmission 1 having a shift pressure control apparatus according to an embodiment of the present invention as well as a shift control system for the automatic transmission 1.

The power train includes an engine 2 on the side of an input shaft of the automatic transmission 1. The automatic transmission 1 is drivingly connected with the engine 2 through an torque converter 3.

The power output of the engine 2 is adjusted by a throttle valve 4. The rotation of the engine 2 is inputted through the torque converter 3 to the automatic transmission 1.

The automatic transmission 1 converts an input rotation from the engine 2 into an output rotation of a rotational speed and a torque corresponding to a selected gear speed, and transmits the output rotation through an output shaft 5 toward drive wheels (not shown) for driving the vehicle.

The automatic transmission 1 includes a control valve body 6 used for shift control. The control valve body 6 has shift solenoids 7 and 8 inserted therein as well as an oil pressure source 9 built therein, although they are shown out of the control valve body 6 in FIG. 1 for convenience' sake.

The oil pressure source 9 creates a shift pressure Ps (generally referred to as a line pressure) by using working fluid discharged from an engine-driven oil pump 10, and delivers the shift pressure to the shift solenoids 7 and 8 to serve the later mentioned shift control of the automatic transmission 1 and also to the torque converter 3 for its actuation.

The oil pressure source 9 includes an orifice 11, a line pressure solenoid 12, a pressure modifier valve 13 and a pressure regulator valve 14.

The line pressure solenoid 12 operates under duty control as mentioned later. The line pressure solenoid 12 creates a pilot pressure corresponding to the desired shift pressure Ps with a discharge pressure supplied through the orifice 11 from the oil pump 10, and then applies the pilot pressure to the pressure modifier valve 13.

The pressure modifier valve 13 amplifies the aforementioned pilot pressure to supply to the pressure regulator valve 14. The pressure regulator valve 14 adjusts the discharge pressure from the oil pump 10 to the shift pressure Ps which is proportional to the pilot pressure from the pressure modifier valve 13, and supplies the shift pressure Ps to the torque converter 3 and the shift solenoids 7 and 8.

The automatic transmission 1 determines the drive path (or selected gear speed) in the gear mechanism by supplying the shift pressure Ps to corresponding friction engagement elements through on/off combination of shift solenoids 7 and 8. The on/off action of shift solenoids 7 and 8 and duty control of the line pressure solenoid 12 are governed by a transmission controller 21.

To meet this, the controller 21 receives input information about the opening degree of the throttle valve 4 (throttle opening: TVO) from the throttle opening sensor 22, engine intake air quantity Q from an intake air quatity sensor 23, engine speed Ne from an engine speed sensor 24, transmission output speed No (vehicle speed: VSP) from a vehicle speed sensor 25, and turbine speed Nt which represents the output speed of the torque converter 3 from a turbine speed sensor 26. In this example, the throttle opening TVO is used as the operating parameter representing engine load.

Figure 2:
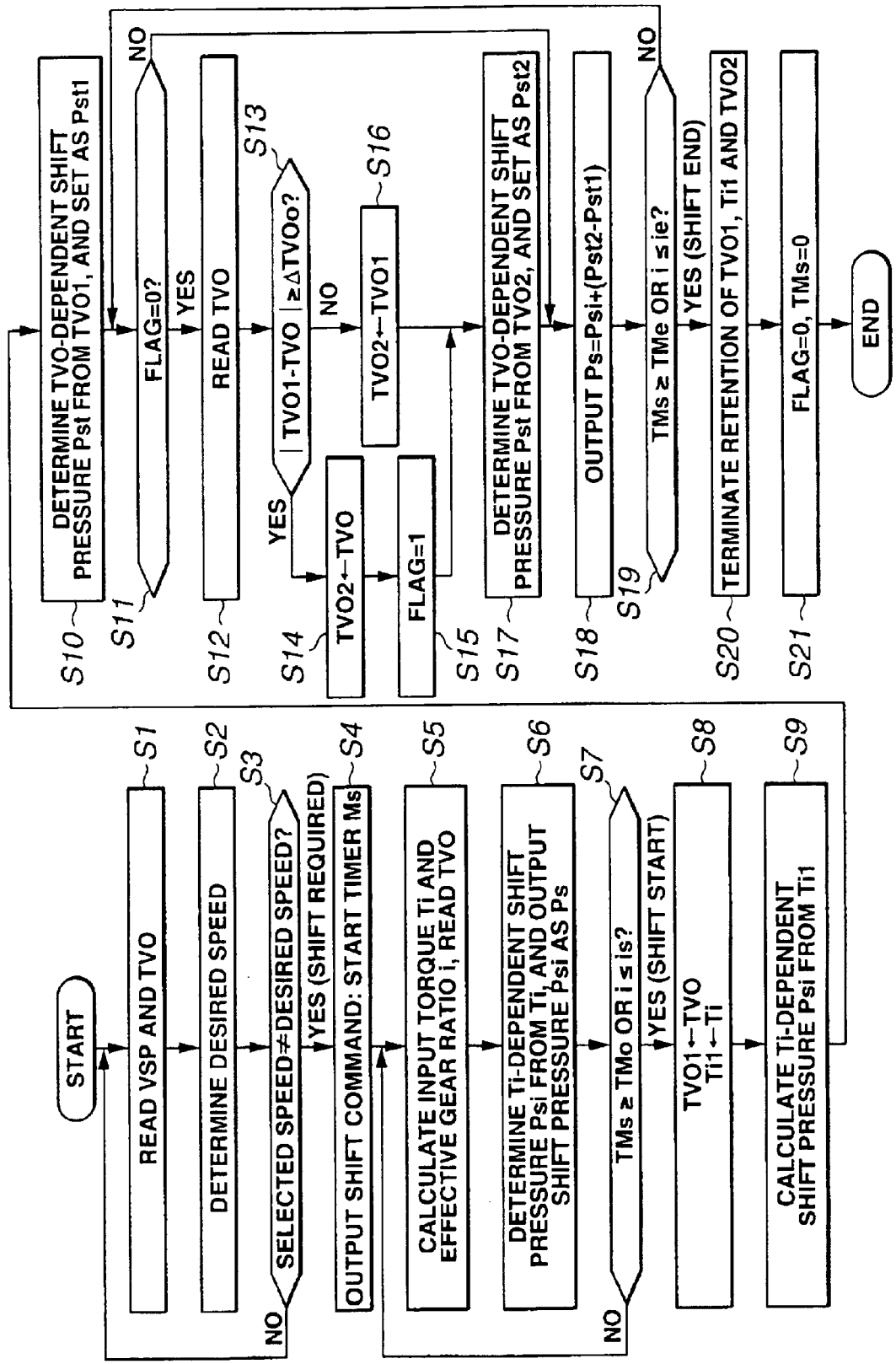
FIG. 2 is a flowchart showing a shift pressure control process performed by the control system of FIG. 1.
Figure 3:
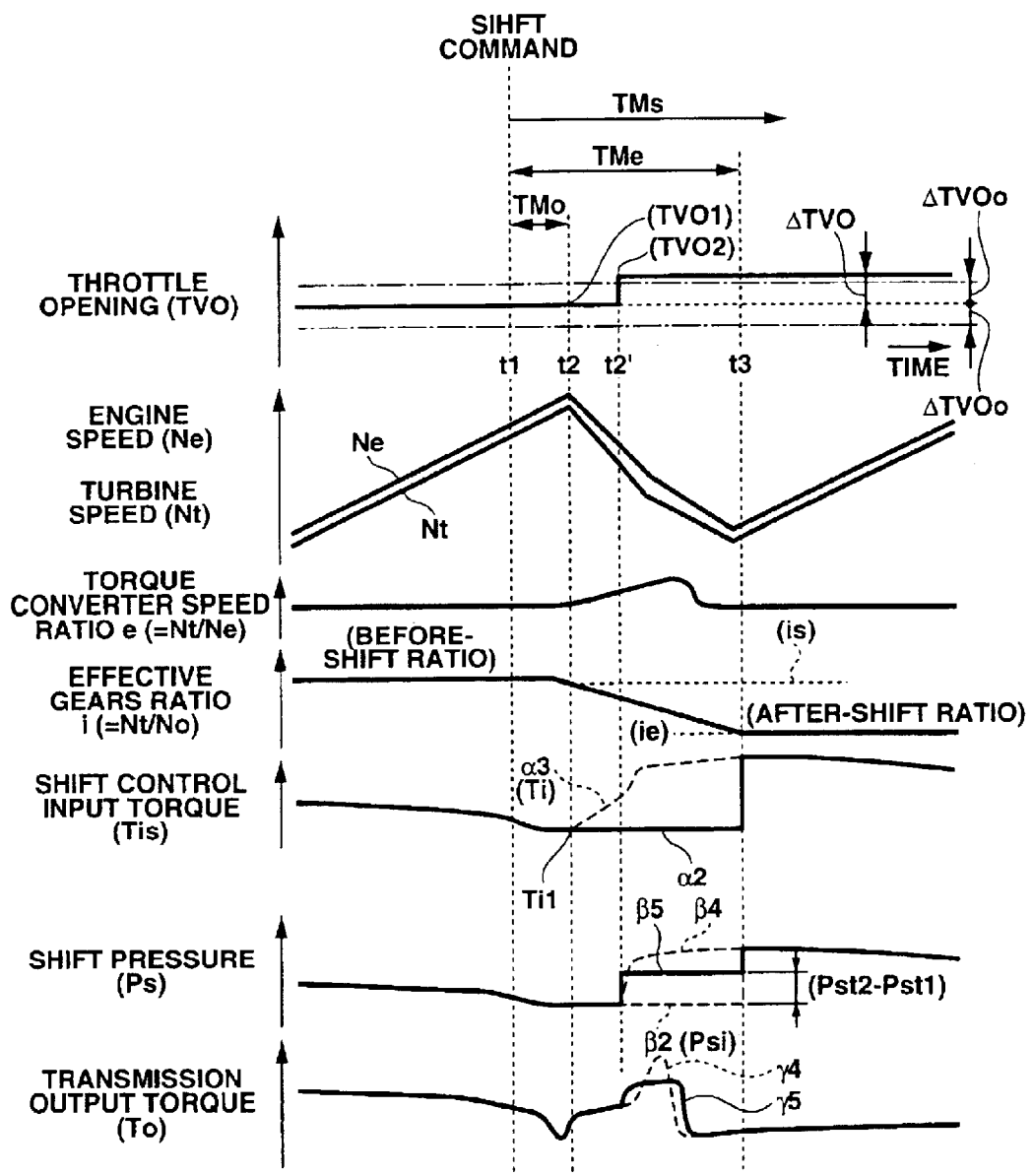
FIG. 3 is a time chart illustrating operations of the shift pressure control system shown in FIGS. 1 and 2.

The controller 21 executes a control program shown in FIG. 2 based on these input information and performs the shift control and shift pressure control as shown in FIG. 3.

In the control program shown in FIG. 2, the first step S1 reads the vehicle speed VSP and the throttle opening TVO.

The next step S2 determines a desired speed for the present operating condition from the vehicle speed VSP and the throttle opening TVO based on the predetermined shift pattern.

Step S3 compares the present speed with the above desired speed and determines the need of the shift depending on whether the two speeds are different or not. Steps S1~S3 form a shift request decision loop which determines whether a shift operation is required or not.

If the controller decides that the present speed is the same as the desired speed and the shift is not required, the routine is returned to step S1 for the next iteration of the above shift request decision loop. On the other hand, if the controller decides that the present speed is not the same as the desired speed and the shift is required, the routine proceeds to step S4 and the following steps to perform shift control and shift pressure control.

Step S4 produces a shift command at an instant t1 (a shift command instant), and also starts up the timer TMs to measure an elapsed time from the shift command instant t1 as shown in FIG. 3.

The shift command determines the on/off combination of shift solenoids 7 and 8 required for selecting the above desired speed, and outputs the corresponding signals to shift solenoids 7 and 8. By this command, the automatic transmission 1 can be shifted from the present speed to the desired speed.

In order to control the shift pressure Ps (shown in FIG. 1) to be applied to the friction engagement elements for this shift, the next step S5 calculates a transmission input torque Ti and an effective gear ratio i, and also reads the throttle opening TVO.

The transmission input torque Ti is determined by multiplying an engine torque Te by a torque ratio t of the torque converter 3, where the engine torque Te is determined from the engine speed Ne and the engine intake air quantity Q (refer to FIG. 6), and the torque ratio t is determined from the speed ratio e of the torque converter 3 (refer to FIG. 7) which is the ratio of the turbine speed Nt to the engine speed Ne (e=Nt/Ne).

The effective gear ratio i is determined by dividing the turbine speed Nt (representing the transmission input speed) by the transmission output speed No.

Figure 4A:
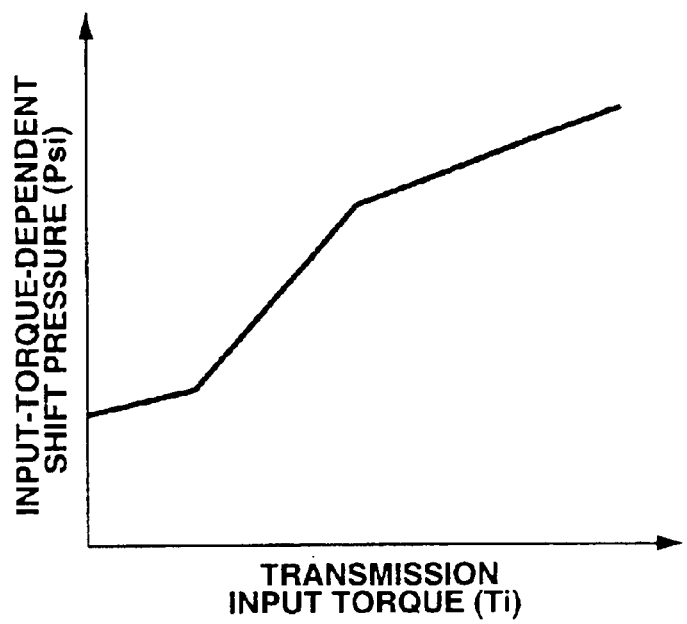
FIGS. 4A and 4B are graphs, respectively, showing a characteristic of the shift pressure with respect to a transmission input torque, and a characteristic of the shift pressure with respect to an engine throttle opening, used in the control process of FIG. 2.

Step S6 determines an input-torque-dependent shift oil pressure Psi (shift pressure determined in dependence on the transmission input torque) from the transmission input torque Ti according to a pressure-torque characteristic map shown in FIG. 4A, and outputs this pressure Psi as the shift pressure Ps to the line pressure solenoid 12 shown in FIG. 1. Thus, the shift pressure Ps to be applied to the friction engagement elements which govern the progress of the shift is adapted to correspond to the transmission input torque Ti.

The pressure-torque characteristic map of the input-torque-dependent shift pressure Psi shown in FIG. 4A is preliminarily determined, by experiments on the design stage of the automatic transmission, as desired value for countermeasure against a shift shock, with respect to the transmission input torque Ti as a parameter.

Step S7 checks whether the above-mentioned timer TMs is not less than a shift start detection time TMo (time to detect the start of the shift) as shown in FIG. 3, or whether the effective gear ratio i is not more than (not less than, when downshifting) a shift start detection gear ratio is (gear ratio to detect the start of the shift); and thereby decides whether a shift start instant t2 (at which the shift starts, that is, the inertia phase starts) shown in FIG. 3 is reached.

During the period until the shift start instant t2, the controller repeats steps S5 and S6 to determines the shift pressure Ps independence on the transmission input torque Ti, and makes the shift progress smoothly.

When step S7 decides that the shift start (inertia phase start) instant t2 is reached, the routine proceeds to step S8. Step S8 stores the throttle opening TVO (engine load) at instant t2 as a first throttle opening value (or throttle opening hold value) TV01, and stores the transmission input torque Ti at instant t2 as a first input torque (or input torque hold value) Ti1 which is used as the shift control input torque Tis.

Step S9 determines the input-torque-dependent shift pressure Psi from the first input torque Ti1 stored at the shift start instant t2 according to the pressure-torque characteristic map shown in FIG. 4A.

Figure 4B:
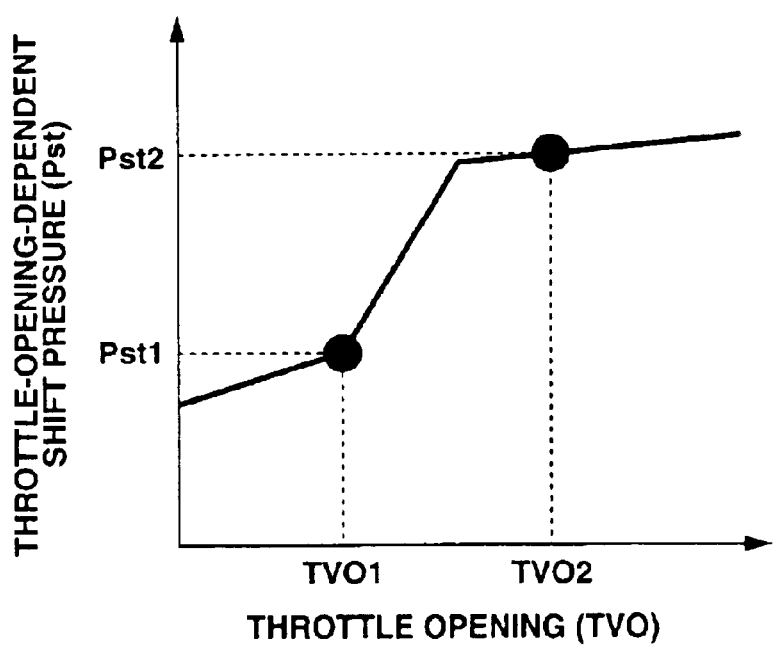

Step S10 determines a throttle-opening-dependent shift pressure Pst (shift pressure determined in dependence on the throttle opening) from the first throttle opening value TV01 stored at the shift start instant t2 according to a pressure-throttle opening (load) characteristic map shown in FIG. 4B, and sets this shift pressure Pst as an first throttle-opening-dependent shift pressure Pst1.

The pressure-throttle opening characteristic map of the throttle-opening-depending shift pressure Pst shown in FIG. 4B is preliminarily determined, by experiments on the design stage of the automatic transmission, as a desired value for countermeasure against a shift shock, with respect to the throttle opening TVO as a parameter.

However, the relation of the transmission input torque Ti variation to the throttle opening TVO variation differs among regions of the throttle opening TVO. Therefore, there is no correlation between the pressure-throttle opening characteristic map of the throttle-opening-dependent shift pressure Pst shown in FIG. 4B and the pressure-torque characteristic map of the input-torque-dependent shift pressure Psi shown in FIG. 4A.

Step S11 checks whether a flag FLAG is 0 or 1. This flag FLAG is a condition code which is set to one on the occurrence of a considerable change in the throttle opening TVO during the shift, as described later.

If FLAG is 0, that is, there is no considerable change in the throttle opening TVO during the shift, the routine proceeds to step S12. Step S12 reads the present throttle opening TVO. The next step S13 checks whether the absolute difference (|TVO1−TVO|) between the present throttle opening TVO and the first throttle opening value TVO1 obtained at the shift start instant t2 is more than or equal to a set value ΔTVO0 illustrated in FIG. 3, to determine whether a considerable change in the throttle opening during the shift occurs.

The set value ΔTVO0 is defined as a minimum value of the throttle opening change which arouses an actual sense of unpleasant shift shock.

When a considerable change in the throttle opening TVO during the shift occurs at the instant t2' shown in FIG. 3, and hence the answer of step S13 is YES, step S14 stores the throttle opening TVO (engine load) at the instant t2' as a second throttle opening value TVO2. Step S15 sets the above-mentioned FLAG to 1 to memorize the occurrence of a considerable change in the throttle opening TVO during the shift.

However, when there is no considerable change in the throttle opening TVO during the shift, and hence the answer of step S13 is NO, the routine proceeds to step S16. Step S16 sets the above first throttle opening value TVO1 as the second throttle opening valve TVO2.

Step S17 determines the throttle-opening-dependent shift pressure Pst from the second throttle opening value TVO2 determined in step S14 or S16 according to the pressure-throttle opening characteristic map shown in FIG. 4B, and sets the determined shift pressure Pst as a second throttle-opening-dependent shift pressure Pst2 (determined by the throttle opening at the time of a throttle operating). Then, the routine proceeds to step S18.

Once step S15 is executed, the answer of step S11 becomes negative, and the routine proceed to step S18 without executing steps S12~S17.

Step S18 determines the shift pressure Ps by adding a difference (Pst2−Pst1) between the second throttle-opening-dependent shift pressure Pst2 (determined at step S17 as illustrated in FIG. 4B) and the first throttle-opening-dependent shift pressure Pst1 (determined at step S10 as illustrated in FIG. 4B), to a starting input-torque-dependent shift pressure Psi (determined at step S9), and outputs the determined shift pressure Ps (Psi+(Pst2−Pst1)) to the line pressure solenoid 12 shown in FIG. 1.

As a result, when a considerable change in the throttle opening TVO occurs at the instant t2' shown in FIG. 3, the shift pressure Ps to be applied to the friction engagement elements for governing the progress of shift operation is varied from the starting input-torque-dependent pressure to the modified pressure shown by a solid line β5 in FIG. 3 which is set equal to a sum of the starting input-torque-dependent pressure Psi and the throttle-opening-dependent shift pressure difference (Pst2−PST1) which corresponds to the input torque change due to the throttle opening change ΔTVO as shown by the broken line β2 in FIG. 3 (corresponding to the same reference numeral shown in FIG. 8).

The shift pressure Ps is conventionally set to the high value as shown by a broken line β4 in FIG. 3 (corresponding to the same reference numeral shown in FIG. 8) in response to the input torque Ti shown by a broken line α3 in FIG. 3 (corresponding to the same reference numeral shown in FIG. 8). Consequently, the output torque To is increased sharply in the waveform shown by a broken line γ4 (corresponding to the same reference numeral shown in FIG. 8), with the result of a great shift shock.

By contrast, the shift pressure control system according to this embodiment determines the correction amount (Pst2−PST1) of the shift pressure Ps accurately in conformity with the input torque change due to the throttle opening (engine load) change ΔTVO, and thereby restrains a shift shock effectively as intended with the waveform of the output torque To as shown by a solid line γ5 in FIG. 3.

Step S19 checks whether the above timer TMs measuring the elapsed time from the shift command instant t1 is not less than a shift end detecting time TMe (time to detect the shift end) shown in FIG. 3, or whether the effective gear ratio i is not more than (not less than, when down shifting) q shift end detecting gear ratio ie (gear ratio to detect the shift end) shown in FIG. 3 to determine whether a shift end instant t3 shown in FIG. 3 (an end of the inertia phase) is reached.

During the period between the instant t2 and the shift end instant t3, the above shift pressure Ps is continuously controlled by repeating steps S11~S18 to achieve the above advantageous effect. When the shift end instant t3 is reached, step S20 releases the hold or retention of the first throttle opening value (TVO1), the at-shift-start transmission input torque (Ti1), and the second throttle opening value (TVO2). Step S21 resets the above-mentioned flag FLAG and the timer TMs to 0 to prepare the next shift operation.

Additionally, in this embodiment, the controller is adapted to modify the shift pressure Ps only when a change in the throttle opening TVO is equal to or more than the preset throttle opening change ΔTVO0. Therefore, the control system can prevent useless repetition of modification of the shift pressure Ps responsive to such a small change in the throttle operation not to cause a sense of unpleasant shift shock.

In the above embodiment, the controller is adapted to control the source pressure (generally called line pressure) of the automatic transmission as the shift pressure Ps. However, as an alternative, in the case of a direct driven valve type automatic transmission capable of controlling the working pressures of friction engagements individually, it is also possible to control direct-acting valves individually to obtain the above-mentioned effects.

This application is based on a prior Japanese Patent Application No. 2003-035898 filed in Japan on Feb. 14, 2003. The entire contents of these Japanese Patent Application No. 2003-035898 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A shift pressure control apparatus for controlling a shift pressure to perform a shift in an automatic transmission, the shift pressure control apparatus comprising:
    a controller
    to determine a starting input-torque-dependent pressure from a transmission input torque at a start of a shift;
    to hold the shift pressure at the starting input-torque-dependent pressure during the shift;
    to monitor an operating parameter representing an engine load of an engine connected with the automatic transmission, to detect an engine load change; and
    to modify the shift pressure to a modified pressure determined by modifying the starting input-torque-dependent pressure with a difference between a second engine-load-dependent pressure determined from the engine load after the engine load change and a first engine-load-dependent pressure determined from the engine load at the start of the shift when the engine load change is detected.

2. The shift pressure control apparatus as claimed in claim 1, wherein the controller is configured to detect the engine load change when a change in the operating parameter representing the engine load is greater than or equal to a predetermined value.

3. The shift pressure control apparatus as claimed in claim 1, wherein the controller is configured to modify the shift pressure to the modified pressure determined by adding the difference between the second engine-load-dependent pressure and the first engine-load-dependent pressure, to the starting input-torque-dependent pressure.

4. The shift pressure control apparatus as claimed in claim 1, wherein the controller is configured to detect the start of the shift; to store a value of the operating parameter and a value of the engine input torque at the time of detection of the start of the shift; to determine the starting input-torque-dependent pressure from the value of the engine input torque stored upon detection of the start of the shift, to hold the shift pressure equal to the starting input-torque-dependent pressure; to detect the engine load change during the shift; to store a value of the operating parameter at the time of detection of the engine load change; and to vary the shift pressure from the starting input-torque-dependent pressure to the modified pressure which is set equal to a sum of the starting input-torque-dependent pressure and the difference between the second engine-load-dependent pressure and the first engine-load-dependent pressure.

5. The shift pressure control apparatus as claimed in claim 1, wherein the shift pressure control apparatus further comprises a throttle sensor to sense a throttle opening of a throttle valve for the engine, and the operating parameter is the throttle opening sensed by the throttle sensor.

6. The shift pressure control apparatus as claimed in claim 1, wherein the controller is configured to determine the starting input-torque-dependent pressure from the transmission input torque at the start of the shift, according to a pressure-torque characteristic of a desired input-torque-dependent fluid pressure with respect to the transmission input torque; and wherein the desired input-torque-dependent fluid pressure of the pressure-torque characteristic increases as the transmission input torque increases.

7. The shift pressure control apparatus as claimed in claim 1, wherein the controller is configured to determine the first engine-load-dependent pressure from the operating parameter representing the engine load at the start of the shift, and the second engine-load-dependent pressure from the operating parameter representing the engine load after the engine load change, by using a pressure-load characteristic of a desired engine-load-dependent fluid pressure with respect to the operating parameter.

8. The shift pressure control apparatus as claimed in claim 7, wherein the desired engine-load-dependent fluid pressure of the pressure-load characteristic increases as the engine load increases.

9. The shift pressure control apparatus as claimed in claim 1, wherein the controller is configured to determine the first engine-load-dependent pressure from the operating parameter representing the engine load at the start of the shift, and the second engine-load-dependent pressure from the operating parameter representing the engine load after the engine load change, by using a pressure-load characteristic of a desired engine-load-dependent fluid pressure with respect to the operating parameter, set to restrain a shift shock in the transmission.

10. A shift pressure control process for controlling a shift pressure to perform a shift in an automatic transmission, the shift pressure control process comprising:

determining a starting input-torque-dependent pressure from a transmission input torque at a start of a shift;

holding the shift pressure at the starting input-torque-dependent pressure during the shift;

monitoring an operating parameter representing an engine load of an engine connected with the automatic transmission, to detect an engine load change; and modifying the shift pressure to a modified pressure determined by modifying the starting input-torque-dependent pressure with a difference between a second engine-load-dependent pressure determined from the engine load after the engine load change and a first engine-load-dependent pressure determined from the engine load at the start of the shift when the engine load change is detected.

11. The shift pressure control process as claimed in claim 10, wherein the shift pressure control process further comprises detecting the start of the shift;

storing a value of the operating parameter, as the engine load at the start of the shift and a value of the engine input torque, as the transmission input torque at the start of the shift, upon detection of the start of the shift;

detecting the engine load change during the shift;

storing a value of the operating parameter, as the engine load after the engine load change, upon detection of the engine load change; and adding the difference between the second engine-load-dependent pressure and the first engine-load-dependent pressure, to the starting input-torque-dependent pressure.

* * * * *